US008660036B2

United States Patent
Kim et al.

(10) Patent No.: US 8,660,036 B2
(45) Date of Patent: Feb. 25, 2014

(54) METHOD FOR CONTROLLING MULTI-SINK/MULTI-PATH ROUTING SENSOR NETWORK AND SENSOR NETWORK USING THE SAME

(75) Inventors: Jae-Ho Kim, Yongin-si (KR); Kwang-Ho Won, Yongin-si (KR); Sang-Shin Lee, Yongin-si (KR); Il-Yeup Ahn, Namyangju-si (KR); Min-Hwan Song, Seoul (KR); Jae-Seok Yoon, Yongin-si (KR); Min-Woo Ryu, Seoul (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 336 days.

(21) Appl. No.: 13/115,219

(22) Filed: May 25, 2011

(65) Prior Publication Data

US 2012/0236855 A1 Sep. 20, 2012

(30) Foreign Application Priority Data

Mar. 18, 2011 (KR) .......................... 10-2011-0024352

(51) Int. Cl.
*H04L 1/00* (2006.01)

(52) U.S. Cl.
USPC ............................ 370/255; 370/337; 370/390

(58) Field of Classification Search
None
See application file for complete search history.

(56) References Cited

U.S. PATENT DOCUMENTS

| 2008/0133635 | A1* | 6/2008 | Aunet ........................... 708/702 |
| 2010/0085242 | A1* | 4/2010 | Kim et al. ..................... 342/145 |
| 2010/0146157 | A1* | 6/2010 | Choi et al. ...................... 710/22 |
| 2011/0235504 | A1* | 9/2011 | Nozaki et al. ................. 370/221 |

* cited by examiner

*Primary Examiner* — Ayaz Sheikh
*Assistant Examiner* — Mounir Moutaouakil
(74) *Attorney, Agent, or Firm* — Lowe Hauptman & Ham, LLP

(57) ABSTRACT

A method for controlling a multi-sink/multi-path routing sensor network and a sensor network system using the same are provided. The method for controlling the sensor network includes generating, at a sensor node, sensing data; transmitting, at the sensor node, the sensing data to a plurality of sink nodes; and forwarding, at the sink nodes receiving the sensing data from the sensor node, the sensing data to a gateway. Hence, it is possible to satisfy the reliability required in the safety-critical system with the minimum traffic. Both of the two conflicting requirements which are the reliability enhancement of the sensor network and the minimization of the network traffic in the repeated data transmission, can be satisfied adequately.

9 Claims, 4 Drawing Sheets

METHOD FOR CONTROLLING MULTI-SINK/MULTI-PATH ROUTING SENSOR NETWORK AND SENSOR NETWORK USING THE SAME

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Mar. 18, 2011, and assigned Serial No. 10-2011-0024352, the entire disclosure of which is hereby incorporated by reference.

TECHNICAL FIELD OF THE INVENTION

The present invention relates generally to a method for controlling a sensor network and a sensor network system using the same. More particularly, the present invention relates to a method for controlling a sensor network to apply to a safety-critical system, and a sensor network system for guaranteeing reliability using the same.

BACKGROUND OF THE INVENTION

To satisfy reliability demanded in a wireless sensor network, a technique for enhancing the reliability of the network using multi-path is suggested. The reliability enhancement technique based on the multi-path aims to maximize data transfer reliability from a transmitting node to a receiving node, and maximizes the reliability enhancement by further transmitting redundancy data.

However, when a sink node has error or a path to the sink node is problematic in the wireless sensor network, it is difficult to ensure the reliability of the network.

As the redundancy data concentrates network traffic to the sink node, the sink node is subject to a bottleneck and thus the performance of the network is degraded.

SUMMARY OF THE INVENTION

To address the above-discussed deficiencies of the prior art, it is a primary aspect of the present invention to provide a method for controlling a multi-sink/multi-path routing sensor network so that a sensor network satisfies reliability demanded in a safety-critical system and generates minimum traffic, and a sensor network system using the same.

According to one aspect of the present invention, a method for controlling a sensor network includes generating, at a sensor node, sensing data; transmitting, at the sensor node, the sensing data to a plurality of sink nodes; and forwarding, at the sink nodes receiving the sensing data from the sensor node, the sensing data to a gateway.

The transmitting may, at the sensor node, repeatedly transmit the sensing data to the plurality of the sink nodes.

Data redundancy factors for repeatedly transmitting the sensing data may be determined differently per sink node.

The data redundancy factors may be set to minimize a square of a difference of reliability required in the sensor network and actual reliability of the sensor network.

The data redundancy factors may be obtained by dividing a maximum capacity of the sensing data which minimizes the square of the difference of the reliability required in the sensor network and the actual reliability of the sensor network, by the number of routes interconnecting the sensor node and the sink nodes.

A capacity of the sensing data transmitted from the sensor node to one of the sink nodes may be limited to C/N where C denotes a traffic capacity of the sensor network and N denotes the number of nodes building the sensor network.

The method may further include when a repeated transmission capacity of the sensing data for satisfying the reliability required by the sensor network exceeds C/N notifying that the reliability required by the sensor network is not satisfied.

According to another aspect of the present invention, a sensor network includes a sensor node for generating sensing data; a plurality of sink nodes for receiving the sensing data from the sensor node; and a gateway for receiving the sensing data from the sink nodes which receive the sensing data from the sensor node.

The sensor node may repeatedly transmit the sensing data to the plurality of the sink nodes.

Data redundancy factors for repeatedly transmitting the sensing data may be determined differently per sink node.

The data redundancy factors may be set to minimize a square of a difference of reliability required in the sensor network and actual reliability of the sensor network.

The data redundancy factors may be obtained by calculating a maximum capacity of the sensing data which minimizes the square of the difference of the reliability required in the sensor network and the actual reliability of the sensor network, by the number of routes interconnecting the sensor node and the sink nodes.

A capacity of the sensing data transmitted from the sensor node to one of the sink nodes may be limited to C/N where C denotes a traffic capacity of the sensor network and N denotes the number of nodes building the sensor network.

When the capacity of the sensing data exceeds C/N, information that the reliability required by the sensor network is not satisfied may be notified.

A computer-readable recording medium contains a program for fulfilling a sensor network control method which includes generating, at a sensor node, sensing data; transmitting, at the sensor node, the sensing data to a plurality of sink nodes; and forwarding, at the sink nodes receiving the sensing data from the sensor node, the sensing data to a gateway.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

1. Outline

The present invention employs a path redundancy scheme and a data redundancy scheme in order to further enhance reliability required when a sensor network is applied to a safety-critical system such as railway control system and disaster prevention system.

The path redundancy is realized using a multi-sink scheme and a multi-path scheme, which shall be elucidated in Section 2.

Meanwhile, the data redundancy control for suppressing network traffic increase when the sensor network adopts the data redundancy scheme and for satisfying a reliability level demanded in the safety-critical system shall be explained in Section 3.

2. Multi-Sink/Multi-Path Routing

A path from a source node to a sink node is a route. In the multi-sink/multi-path routing, there are several routes from one source node to one sink node.

Figure 1:
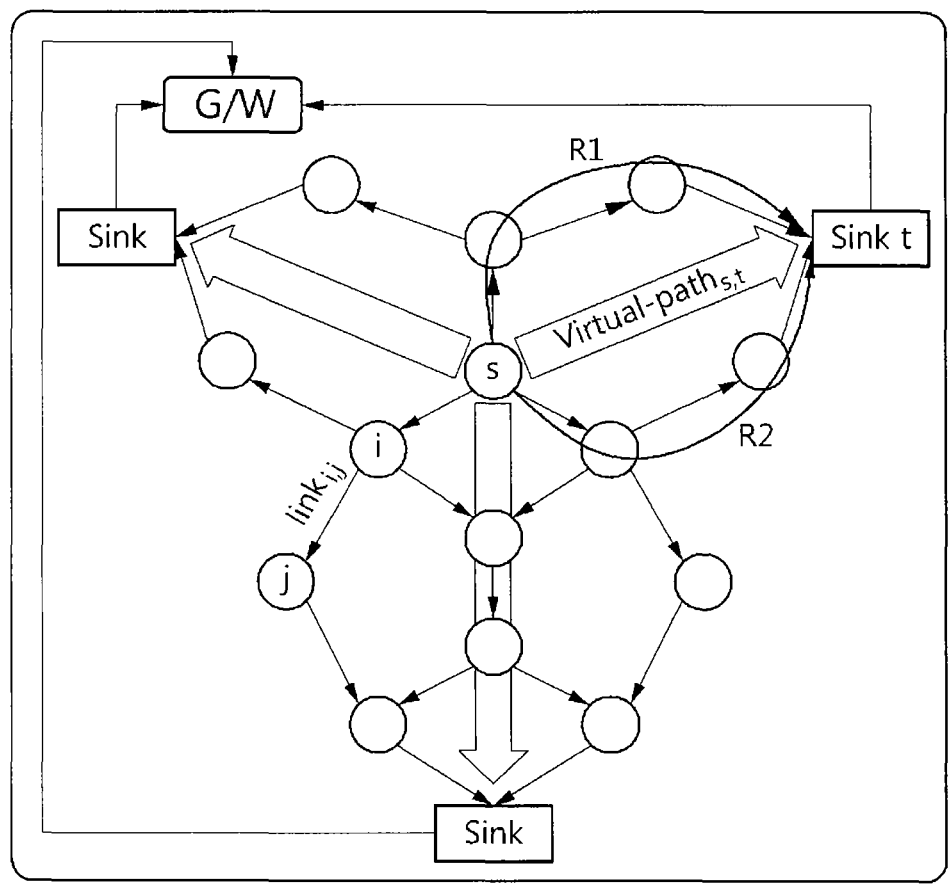
FIG. 1 is a diagram of a sensor network system applying multi-sink/multi-path routing.

FIG. 1 is a diagram of a sensor network system applying the multi-sink/multi-path routing. Referring to FIG. 1, there are two routes R1 and R2 in total from the source node s to a t-th sink node (Sink t).

A set of the routes from one source node to one sink node is defined as a virtual path. In FIG. 1, the virtual path from the source node s to the t-th sink node is {R1, R2}.

In FIG. 1, three sink nodes are directly connected to a gateway (G/W). As such, the plurality of the sink nodes resides in the sensor network system applying the multi-sink/multi-path routing. That is, the sensor network system applying the multi-sink/multi-path routing adopts the multi-sink scheme.

Accordingly, even when any one sink node or any one route to the sink node has a problem, there is no difficulty in transmitting sensing data generated by the source node to the G/W because the sensing data can be transferred to the G/W via other sink node.

Since the sensor network system applying the multi-sink/multi-path routing includes the plurality of the sink nodes, one sensor node has the virtual paths as many as the sink nodes. As the network system of FIG. 1 includes three sink nodes, the source node s has three virtual paths in total.

3. Optimal Data Redundancy Control in Multi-Sink/Multi-Path Routing

Now, descriptions provide optimal data redundancy control for redundantly transmitting the sensing data by applying the data redundancy and for preventing the excessive increase of the network traffic so as to raise the reliability of the multi-sink/multi-path routing sensor network to the required level.

3.1. Routing Reliability in Multi-Sink/Multi-Path Routing

The multi-sink/multi-path routing covers the plurality of the virtual paths, one virtual path includes a plurality of routes, and one route includes one or more links as shown in FIG. 1.

Provided that a probability of generating transmission error in the link $l_{i,j}$ from the node i to the node j is $P_{i,j}$, the reliability $\alpha_r$ for a particular route r is given by Equation 1.

$$\alpha_r = \prod_{l_{i,j} \in L_r} (1 - p_{i,j}) \qquad \text{[Equation 1]}$$

$L_r$ denotes a set of one or more links building the particular route r.

The reliability $\beta_{s,t}$ for the virtual path which is the set of the routes from the source node s to the t-th sink node is given by Equation 2.

$$B_{s,t} = 1 - \prod_{r \in R_{s,t}} (1 - \alpha_r) \qquad \text{[Equation 2]}$$

$R_{s,t}$ denotes the set of the routes from the source node s to the t-th sink node.

The reliability $\gamma_s$ for the whole path from the source node s to the G/W is given by Equation 3.

$$\gamma_s = 1 - \prod_{t=1}^{M} (1 - \beta_{s,t})^{c_{s,t}} \qquad \text{[Equation 3]}$$

M denotes the number of the virtual paths for the source node s, and $c_{s,t}$ denotes a data redundancy factor for the respective virtual paths. $c_{s,t}$ can be defined per virtual path.

Figure 2:
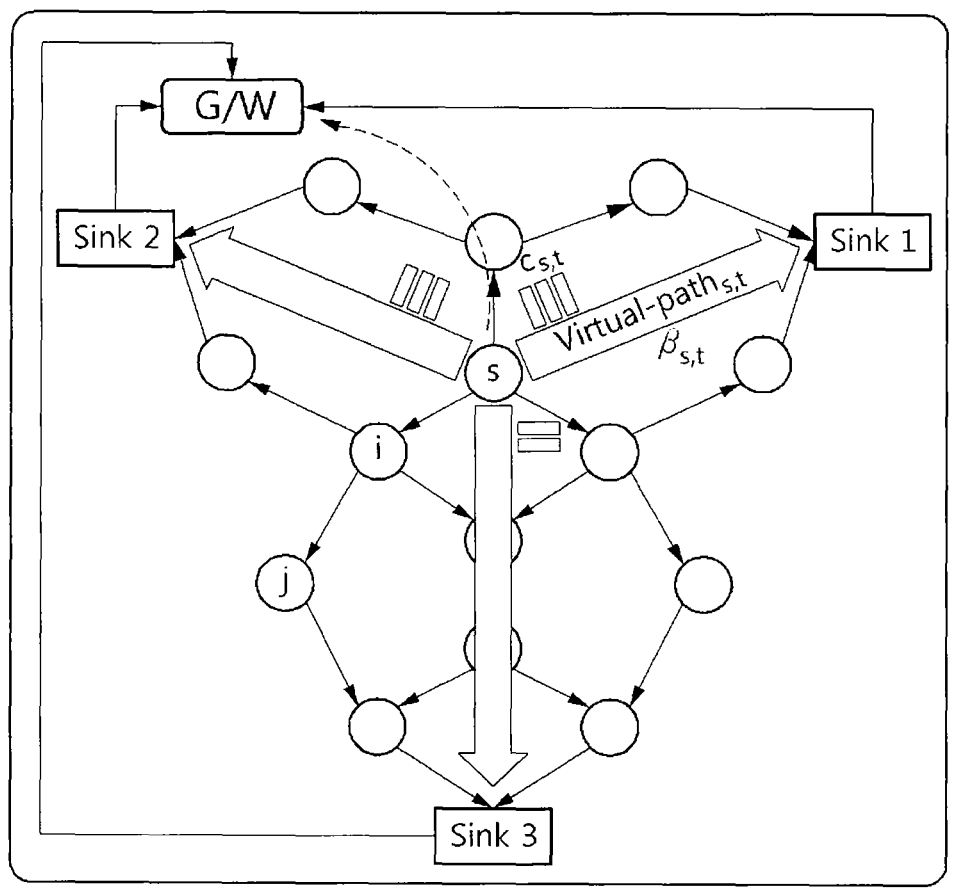
FIG. 2 is a diagram of data redundancy factor setting for respective virtual paths.

In FIG. 2, $c_{s,t}$ for the virtual path to the first sink node (Sink 1) is 3 (transmits the same sensing data for three times), $c_{s,t}$ for the virtual path to the second sink node (Sink 2) is 3 (transmits the same sensing data for three times), and $c_{s,t}$ for the virtual path to the third sink node (Sink 3) is 2 (transmits the same sensing data for two times) by way of example.

3.2. Traffic Capacity of Network

As $c_{s,t}$ increases, the reliability increases. Thus, it is necessary to increase $c_{s,t}$ to satisfy the reliability required by the sensor network. However, since the increase of $c_{s,t}$ results in the network traffic increase, trade-off involves the reliability and the network traffic.

Hence, the traffic capacity of the network should be considered when $c_{s,t}$ is increased.

In the multi-sink/multi-path routing sensor network, the plurality of the sensor nodes transmits their sensing data to the limited number of the sink nodes. Naturally, the traffic rises in vicinity of the sink node. In result, the traffic capacity of the multi-sink/multi-path routing sensor network is determined by the link connected to the sink node.

Figure 3:
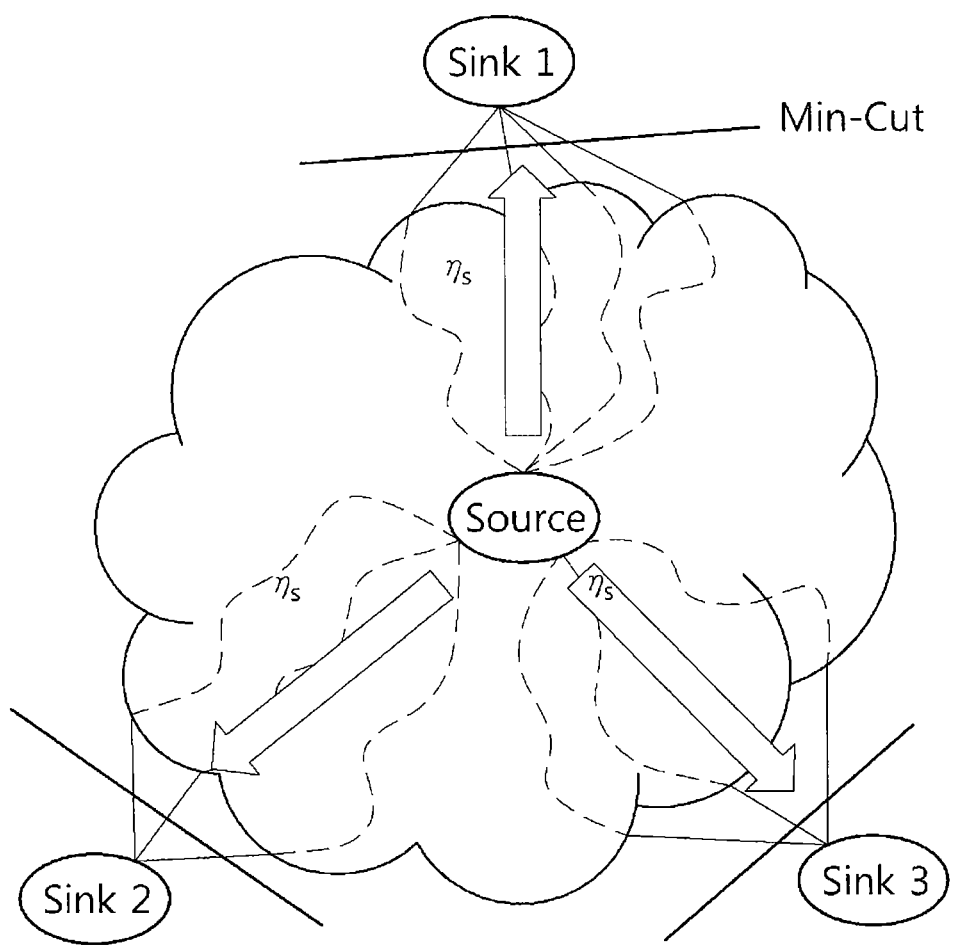
FIG. 3 is a diagram of mini-cut in a multi-sink/multi-path routing sensor network.

That is, in the multi-sink/multi-path routing sensor network, the links connected to the sink nodes become the bottleneck links. According to the max-flow min-cut theorem, the link connected to the sink nodes which are the min-cut is the max-flow of the network as shown in FIG. 3. Hence, the traffic capacity of the multi-sink/multi-path routing sensor network can equal the traffic capacity of the links connected to the sink nodes.

Provided that N-ary nodes in the multi-sink/multi-path routing sensor network equally share the traffic capacity for the sake of load balancing, the traffic capacity usable by one sensor node to transmit data to one sink node is C/N where C denotes the traffic capacity for one sink node of the multi-sink/multi-path routing sensor network. Hence, the maximum traffic capacity transmitted from one sensor node to one sink node is limited to C/N.

For the load balancing, assuming the same capacity of the sensing data transmitted from the source node s to the sink nodes, the capacity $\eta_s$ of information transmitted from the source node s to the particular sink node can be expressed as Equation 4.

$$\eta_s = c_{s,t} * Q_{s,t}, \text{ for all } t \in M \qquad \text{[Equation 4]}$$

M denotes the number of the sink nodes and $Q_{s,t}$ denotes the number of the routes interconnecting the source node s and the t-th sink node.

3.3. Optimal Data Redundancy Factor Control

To set the optimal redundancy factor in the multi-sink/multi-path routing sensor network, it is necessary to calculate $\eta_s$ satisfying Equation 5.

$$\text{Minimize} \quad U(\eta_s)$$
$$\text{subject to} \quad 0 \le \eta_s \le \frac{C}{N}$$

$U(\eta_s)$ can be defined as the square of the difference between the reliability k required in the multi-sink/multi-path routing sensor network and the actual reliability $\gamma_s$ of the multi-sink/multi-path routing sensor network as expressed in Equation 6.

$$U(\eta_s) = (k - \gamma_s)^2 = \left( \prod_{t=1}^{M} (1 - \beta_{s,t})^{\frac{\eta_s}{Q_{s,t}}} + k - 1 \right)^2 \quad \text{[Equation 6]}$$

$U(\eta_s)$ is a quadratic equation and its graph varies depending on the size of $\eta_s$ minimizing $U(\eta_s)$. $\eta_s$ minimizing $U(\eta_s)$ is a value which makes a first-order differential value of $U(\eta_s)$ zero.

Figure 4:
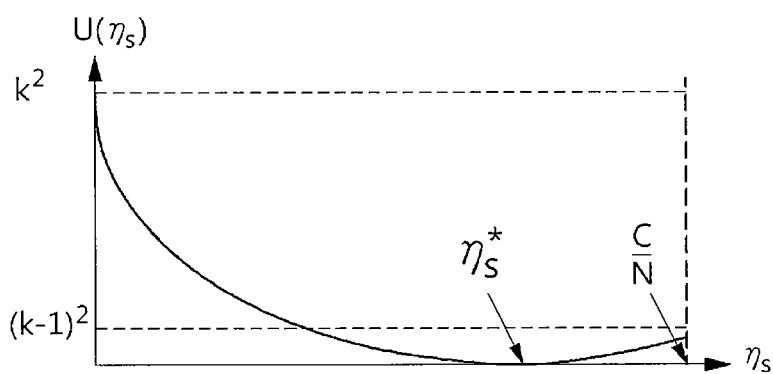
FIGS. 4 and 5 are graphs of a function $U(\eta_s)$.

When $\eta_s$ minimizing $U(\eta_s)$ is less than C/N, the graph of $U(\eta_s)$ is drawn as shown in FIG. 4. Referring to FIG. 4, $\eta_s^*$ minimizing $U(\eta_s)$ is $\eta_s$ minimizing $U(\eta_s)$ (that is, $\eta_s$ which makes the first-order differential value of $U(\eta_s)$ zero). $\eta_s^*$ is given by Equation 7.

$$\text{If } \eta_s \le \frac{C}{N} \Rightarrow \eta_s^* = \frac{\log(1-k)}{\sum_{t=1}^{M} Q_{s,t}^{-1} \log(1 - \beta_{s,t})} \quad \text{[Equation 7]}$$

Figure 5:
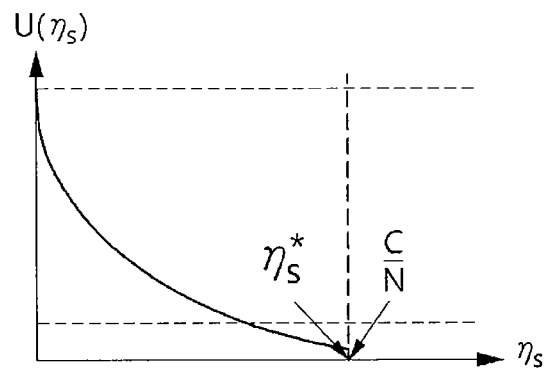

In the meantime, when $\eta_s$ minimizing $U(\eta_s)$ exceeds C/N, the graph of $U(\eta_s)$ is shown in FIG. 5. Referring to FIG. 5, $\eta_s^*$ minimizing $U(\eta_s)$ is C/N which is the maximum value of $\eta_s$, as expressed in Equation 8.

$$\text{If } \eta_s > \frac{C}{N} \Rightarrow \eta_s^* = \frac{C}{N} \quad \text{[Equation 8]}$$

The optimal data redundancy factor $c_{s,t}$ can be calculated by applying $\eta_s^*$ obtained based on Equation 7 or Equation 8 and the number of the routes $Q_{s,t}$ interconnecting the source node s and the t-th sink node to Equation 9.

$$c_{s,t} = \left\lceil \frac{\eta_s^*}{Q_{s,t}} \right\rceil \quad \text{[Equation 9]}$$

When the multi-sink/multi-path routing sensor network is controlled with $c_{s,t}$ obtained based on Equation 9, it is possible to satisfy the required reliability and to prevent the excessive increase of the sensor network traffic.

Meanwhile, when $\eta_s$ minimizing $U(\eta_s)$ exceeds C/N, the required reliability k may not be satisfied even by redundantly transmitting the sensing data by applying the data redundancy up to the available network traffic. In this case, it is preferred to notify a network administrator that the reliability required in the sensor network is not satisfied, and to meet the required reliability by changing the deployment of the nodes of the sensor network or leading to add nodes.

It is noted that the present invention can be realized as a program which is executable in a computer and other electronic devices.

As set forth above, it is possible to satisfy the reliability required in the safety-critical system with the minimum traffic. Therefore, both of the two conflicting requirements which are the reliability enhancement of the sensor network and the minimization of the network traffic in the repeated data transmission, can be satisfied adequately.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a sensor network comprising:
   generating, at a sensor node, sensing data;
   repeatedly transmitting, at the sensor node, the sensing data to a plurality of sink nodes, wherein data redundancy factors for repeatedly transmitting the sensing data are determined differently per sink node, and the data redundancy factors are set to minimize a square of a difference of reliability required in the sensor network and actual reliability of the sensor network; and
   forwarding, at the sink nodes receiving the sensing data from the sensor node, the sensing data to a gateway.

2. The method of claim 1, wherein the data redundancy factors are obtained by dividing a maximum capacity of the sensing data which minimizes the square of the difference of the reliability required in the sensor network and the actual reliability of the sensor network, by the number of routes interconnecting the sensor node and the sink nodes.

3. The method of claim 2, wherein a capacity of the sensing data transmitted from the sensor node to one of the sink nodes is limited to C/N where C denotes a traffic capacity of the sensor network and N denotes the number of nodes building the sensor network.

4. The method of claim 3, further comprising: when a repeated transmission capacity of the sensing data for satisfying the reliability required by the sensor network exceeds C/N, notifying that the reliability required by the sensor network is not satisfied.

5. A sensor network comprising:
   a sensor node configured to generate sensing data and repeatedly transmits the sensing data to the plurality of the sink nodes, wherein data redundancy factors for repeatedly transmitting the sensing data are determined differently per sink node and the data redundancy factors are set to minimize a square of a difference of reliability required in the sensor network and actual reliability of the sensor network;
   a plurality of sink nodes configured to receive the sensing data from the sensor node; and
   a gateway configured to receive the sensing data from the sink nodes which receive the sensing data from the sensor node.

6. The sensor network of claim 5, wherein the data redundancy factors are obtained by calculating a maximum capacity of the sensing data which minimizes the square of the difference of the reliability required in the sensor network and the actual reliability of the sensor network, by the number of routes interconnecting the sensor node and the sink nodes.

7. The sensor network of claim 6, wherein a capacity of the sensing data transmitted from the sensor node to one of the sink nodes is limited to C/N where C denotes a traffic capacity of the sensor network and N denotes the number of nodes building the sensor network.

8. The sensor network of claim 7, wherein, when the capacity of the sensing data exceeds C/N, information that the reliability required by the sensor network is not satisfied is notified.

9. A non-transitory computer-readable recording medium containing a program for fulfilling a sensor network control method, the method comprising:
- generating, at a sensor node, sensing data;
- repeatedly transmitting, at the sensor node, the sensing data to a plurality of sink nodes, wherein data redundancy factors for repeatedly transmitting the sensing data are determined differently per sink node, and the data redundancy factors are set to minimize a square of a difference of reliability required in the sensor network and actual reliability of the sensor network; and
- forwarding, at the sink nodes receiving the sensing data from the sensor node, the sensing data to a gateway.

* * * * *